United States Patent [19]

Kramer et al.

[11] Patent Number: 5,369,243

[45] Date of Patent: Nov. 29, 1994

[54] METHOD AND SYSTEM FOR DETERMINING OPERATING CHARACTERISTICS OF ARC WELDING WIRE

[75] Inventors: Arthur Kramer, Solon; Boris Kahn, Beachwood, both of Ohio

[73] Assignee: The Lincoln Electric Company, Cleveland, Ohio

[21] Appl. No.: 117,539

[22] Filed: Sep. 7, 1993

[51] Int. Cl.$^5$ .............................................. B23K 9/095
[52] U.S. Cl. .............................................. 219/130.01
[58] Field of Search ...................... 219/130.01, 130.21, 219/137 PS

[56] References Cited

U.S. PATENT DOCUMENTS 5,221,825 6/1993 Siewert et al. ................. 219/130.01

OTHER PUBLICATIONS

Adam et al, "Sensing of GMAW Droplet Transfer Modes Using an ERIOOS-1 Electrode", *Welding Research Supplement*, Mar. 1990, pp. 1035–1085.

Liu et al, "Metal Transfer Mode In Gas Metal Arc Welding", *ASM Reprint*, May 1989, pp. 475–479.

Heald et al, "Droplet Transfer Modes for a Mil 1005-1 GMAW Electrode", *NISTIR 3976*, Oct. 1991, pp. 1–22.

*Primary Examiner*—Clifford C. Shaw
*Attorney, Agent, or Firm*—Vickers Daniels & Young

[57] ABSTRACT

A system for locating a voltage sensitive parameter of an electric arc welding wire, which parameter is indicative of the welder perceived welding characteristics of said wire, said system comprises: means for feeding said wire toward a workpiece; means for applying a voltage between said wire and said workpiece whereby a welding arc is created between said wire and said workpiece to melt and deposit said wire onto said workpiece by a voltage sensitive arc welding procedure; means for gradually changing said applied voltage whereby said welding procedure shifts through a transfer region and between spray and globular welding; means detecting the actual voltage between the wire and workpiece as said applied voltage is changed; means for sensing each time when said actual voltage decreases below a selected threshold voltage; means for averaging the sensed number of times; means for detecting the applied voltage value when the averaged sensed number of times equals a selected number; and, means for selecting said selected number to have a value indicative of said welding procedure being in said transfer region.

14 Claims, 7 Drawing Sheets

METHOD AND SYSTEM FOR DETERMINING OPERATING CHARACTERISTICS OF ARC WELDING WIRE

The present invention relates to the art of electric arc welding with filler wire and more particularly to a method and system for measuring or determining the operating characteristics of an arc welding wire of the type sold on a spool, reel, coil or drum.

BACKGROUND OF INVENTION

The invention is particularly applicable for use with filler wire for arc welding of the type provided on spools or reels and used for automatic or semi-automatic arc welding processes. Indeed, the invention is most applicable for use with filler wire sold in large spools or reels and used for robotic, automatic welding and it will be described with particular reference to this specific type of filler wire used for mass production; however, it should be appreciated that the invention has broader applications and can be used to predict and/or determine the quality of the filler wire and to future operating characteristics of a filler wire. The invention uses predictive or indirect testing procedure for filler wire.

When employing robotic welding equipment for mass producing repetitive welds, the manufacturing facility obtains filler wire normally having a low carbon content and supplied to the manufacturing facility in large coils or reels. The reels are loaded onto the welding machine, which welding machine has been set to a preselected wire feed speed, applied voltage levels and other process parameters. At the end of a reel, a replacement reel of filler wire is loaded onto the machine. In some instances, the end of the wire on the first reel is spliced to the beginning of the wire on the second reel. In this manner, the mass produced repetitive welding operations are performed continuously and economically to reduce the cost of the product being manufactured. This high production arc welding procedure requires a consistent filler wire and, more for cosmetic purposes, the filler wire should create a low amount of spatter, or no spatter, during the welding process. The requirements of consistency and low spatter are universal requirements for mass producing welds of the type employing filler wire in an arc welding process. If the filler wire is not consistent, the subsequent reels of wire require readjustment of the speed and electrical characteristics of the welding machine. Consequently, if the filler wire is not consistent from reel-to-reel for day-after-day, the filler wire is generally considered unacceptable and does not command commercial allegiance. Not only must the wire from reel-to-reel be consistent, it should be capable of welding without spatter. There is a need to test filler wire to assure consistency before used in mass production procedures.

THE INVENTION

In accordance with the present invention, there is provided a method and system for predicting how filler wire of a given reel will perform in an arc welding process. In the application of the present invention, the filler wire of the type sold on a reel is processed. A voltage is determined for the filler wire which is termed the "spatter voltage", which voltage correlates to future welding characteristics of the wire and is applicable for predicting the electrical characteristics necessary for employing the filler wire in automatic or semi-automatic arc welding processes. It has been found that a filler wire having a specific spatter voltage, as determined by the present invention, will operate consistently in the field. Thus, a manufacturer can use the detected or located spatter voltage for filler wire to gauge the consistency of the wire in the field. It has been found that when filler wire has a specific spatter voltage, as determined by the application of the present invention, it will operate essentially the same as the welding wire on a prior reel. Consequently, the present invention is employed for the purposes of determining a voltage sensitive parameter of a filler wire, which parameter, if the same as prior filler wires, will indicate a consistent operation of filler wire being tested. In addition, the present invention is applicable for determining the optimum applied voltage for a given filler wire for minimizing the amount of spatter. Thus, wire can be manufactured within a preselected tolerance for the spatter voltage.

In accordance with the present invention there is provided a method for locating a voltage sensitive parameter of an electric arc welding filler wire, i.e. "spatter voltage", which parameter is indicative of the welder perceived welding characteristics of the filler wire. This method comprises the steps of feeding the filler wire toward a workpiece, applying a voltage between the filler wire and the workpiece whereby a welding arc is created between the filler wire and the workpiece to melt and deposit the filler wire onto the workpiece by a voltage sensitive arc welding procedure, gradually changing the applied voltage whereby the voltage procedure shifts through a transfer region between spray welding and globular welding, detecting the actual voltage between the wire and workpiece as the applied voltage is changed, sensing each time, event or occurrence when the actual voltage drops below a selected threshold voltage, averaging the sensed number of times or events, detecting the applied voltage value when the average sensed number of events equals a selected number and selecting said selected number in a manner indicative of the welding procedure being in the transfer region between spray transfer and globular transfer.

In accordance with another aspect of the present invention, there is provided a system for locating a voltage sensitive parameter of an electric arc welding filler wire, i.e. spatter voltage, which parameter is indicative of the welder perceived welding characteristics of the filler wire. The system includes providing means for accomplishing the individual method steps of the previously described method aspect of the present invention.

When filler wire is loaded on a reel and placed on a welding machine, an operator adjusts the voltage to create the desired welding characteristics he perceives to be the most advantageous. In accomplishing this objective, the welder normally strikes an arc and watches the welding operation as he adjusts the voltage applied to the welding operation. In addition, the welder, who is a trained specialist, listens to the sound of the arc. When the appearance of the arc and the sound of the arc are optimized, he then locks in the settings of the machine and starts the welding process. This procedure is employed for setting up automatic and semi-automatic welding processes, such as employed by robotic machinery. By employing the present invention, the welder or welding engineering does not need to perform the machine adjustment for each individual reel. A new reel is loaded into the machine and the welding process, as previously set, is continued. Thus, the machine is set and locked at the desired operating characteristics and each reel performs in the same manner.

The present invention locates for a given filler wire a voltage that indicates the ultimate useful characteristics of the filler wire. This located voltage, referred to herein as the "spatter voltage" is indicative of the voltage at which a wire will have the perceived characteristics of an individual welder employing the filler wire as he adjusts the welding process. The voltage being located by implementation of the present invention may not be the same voltage used by an individual welder or an individual welding process actually using the wire. The present invention locates a voltage sensitive parameter which is indicative of the subsequent operation of the filler wire and not a voltage which is communicated to a welder for any individual setting purposes. However, the voltage located by implementation of the present invention, may have some value for subsequent users, but it is not intended to convey an operating characteristic but only to determine that the wire from one reel is the same as the wire in prior reels. As a secondary advantage, the voltage causing low spatter for a particular reel will have the same voltage setting from reel-to-reel. Consequently, as a welder determines the voltage setting for low spatter, as he perceives that characteristic, a wire with the same spatter voltage will have essentially the same spatter characteristics at any adjusted voltage by the operator.

In summary, it is the primary object of the present invention to provide a method and system for locating a voltage sensitive parameter of an electric arc welding filler wire, which parameter is indicative of the welder perceived welding characteristics of the filler wire to assure consistency from reel-to-reel.

Another object of the present invention is the provision of a method and system, as defined above, which method and system allows the manufacturer of filler wire to produce a filler wire which can be employed at a given weld voltage setting and produce consistent welding characteristics.

Yet another object of the present invention is the provision of a method and system, as defined above, which method and system allows a manufacturer to assure production of consistent welding wire so that an end user need not continuously readjust his welding equipment as subsequent filler wire is used.

These and other objects and advantages will become apparent from the following description taken together with the accompanying drawings.

PREFERRED EMBODIMENT OF THE INVENTION

Figure 1:
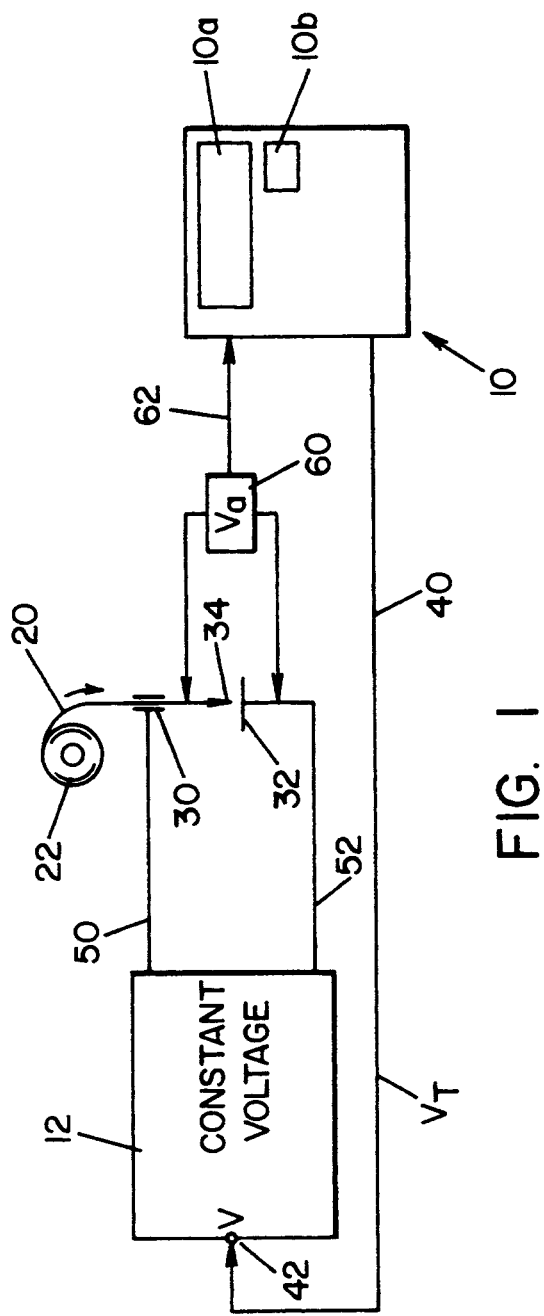
FIG. 1 is a schematic block diagram of an arrangement for performing the preferred embodiment of the present invention.

Referring now to the drawings wherein the showings are for the purpose of illustrating a preferred embodiment of the invention only, and not for the purpose of limiting the same, FIG. 1 shows a testing device 10 of the type implementing the method and system of the present invention. This testing device is computer based for making the calculations employed in the preferred embodiment of the present invention; however, the invention can be performed analog. It has been found that analog implementation of the present invention, which includes a plotting concept, which plot is displayed in panel 10a and a readout for the spatter voltage as digitally displayed in panel 10b requires several hours and trained visual observations. When employing sensing devices of the present invention, together with a computer, the same processes are performed in approximately one minute. For that reason, the computer implementation of the present invention is schematically illustrated in FIG. 1. A constant voltage power supply 12 coacts with the filler wire 20 from a reel 22 that passes through a contact sleeve 30 to create, between a workpiece 32 and the end of the wire 34, an arc for melting the wire and depositing the melted wire onto workpiece 32. In accordance with the present invention, the voltage across the arc between the workpiece and filler wire is decremented in uniform steps to decrease the length of the arc. This voltage stepping is accomplished by voltage decrementing line 40 outputting voltage information to control terminal 42 of constant voltage power supply 12. The voltage signal on line 40 determines the output voltage across lines 50, 52 of the power supply, which voltage $V_T$ is the applied voltage across the arc between the filler wire and workpiece. To determine the actual arc voltage $V_a$, there is provided a voltage meter or voltage sensing device 60 having an output 62 which is directed to the input of testing device 10.

Figure 2C:
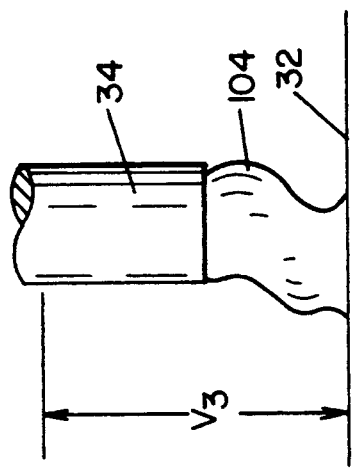
FIGS. 2A–2C are drawings showing progressive decrease of voltage across the arc for the purposes of illustrating the present invention.
Figure 2B:
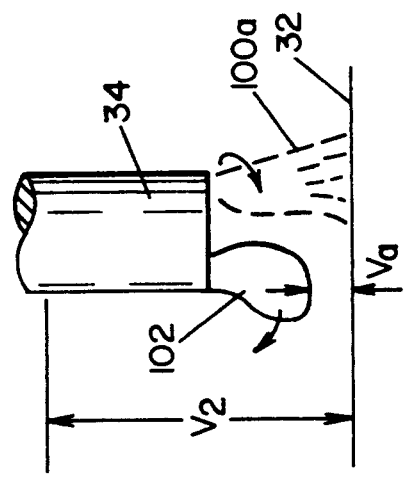
Figure 2A:
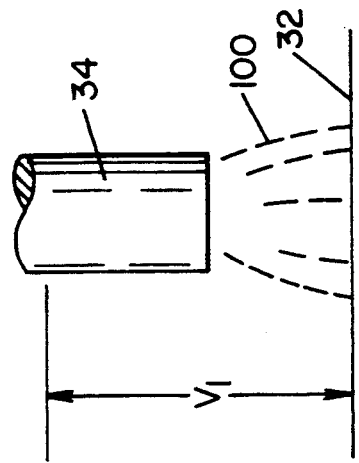

In accordance with the present invention, filler wire 20 is directed through contact sleeve 30 toward the workpiece 32 until an arc is created between the filler wire and workpiece by a relatively high voltage across lines or leads 50, 52. In practice, this voltage is approximately 35 volts D.C. After the arc has been created, device 10 increments the voltage down in relatively small increments to reduce the length of the arc until the voltage has been reduced by 20–30 volts. This reduction takes place in equal voltage drops or steps, which steps occur about fifty times in a one minute test cycle. In practice, each increment or voltage step is 0.24 volts D.C. Thus, the voltage is reduced gradually from a high voltage to a relatively low voltage. At the high voltage level, the arc operates in the spray transfer mode, as shown in FIG. 2A wherein a high voltage $V_1$ between wire 34 and workpiece 32 creates an arc 100. This welding process transfers metal to the workpiece by spray through essentially a pure plasma or arc 100. As the voltage is decremented downwardly, to voltage $V_2$ as shown in FIG. 2B, globular formations 102 occur between wire 34 and workpiece 32. The arc or plasma 100a circulates around the end of the filler wire and globular formations 102 are created by $V_a$. The actual voltage $V_a$ is sensed by device 60 and is communicated with testing device 10 through line 62. As the voltage continues to decrease, as indicated by voltage $V_3$, the arc is reduced until a short circuit occurs when metal 104 bridges the gap between wire 34 and workpiece 32, as shown in FIG. 2C. Then the metal is transferred by the short circuit process. As the voltage applied from power supply 12 gradually decreases, the welding procedure changes as shown in FIGS. 2A–2C. This change, caused by a decrease in the voltage $V_a$ across the filler wire and workpiece is accompanied by a distinct audible noise. In FIG. 2A, as a pure plasma exists, the welding process creates a hum or hissing sound. As the voltage decreases, the welding process shifts to a globular process where the metal is transferred as globular formations 102. Reduced voltage then causes shorts 104 and allows the filler wire to be driven into the workpiece as schematically illustrated in FIG. 2C. There is a relatively high noise in the globular transfer process as shown in FIG. 2B. Indeed, there is substantial spatter occurring at that time. In the short circuit operating mode there are loud explosions caused by necking of the metal formations 104. These various transfer modes of operation from spray transfer to short circuit transfer are accompanied by distinct noise known to welders. In accordance with the present invention, a precise voltage is located between the spray transfer operation, shown in FIG. 2A, and the globular transfer operation, shown in FIG. 2B. The purpose of selecting this voltage in the region between spray transfer and globular transfer is the recognition that this region is a distinct region known and perceived by welders as they set the voltage of an automatic welding process as the voltage is gradually decreased. Identifying this known region as a detectable voltage range is a part of the present invention. Selecting a specific voltage in this region is another aspect of the present invention. This selected voltage is referred to as the "spatter voltage".

Figure 3:
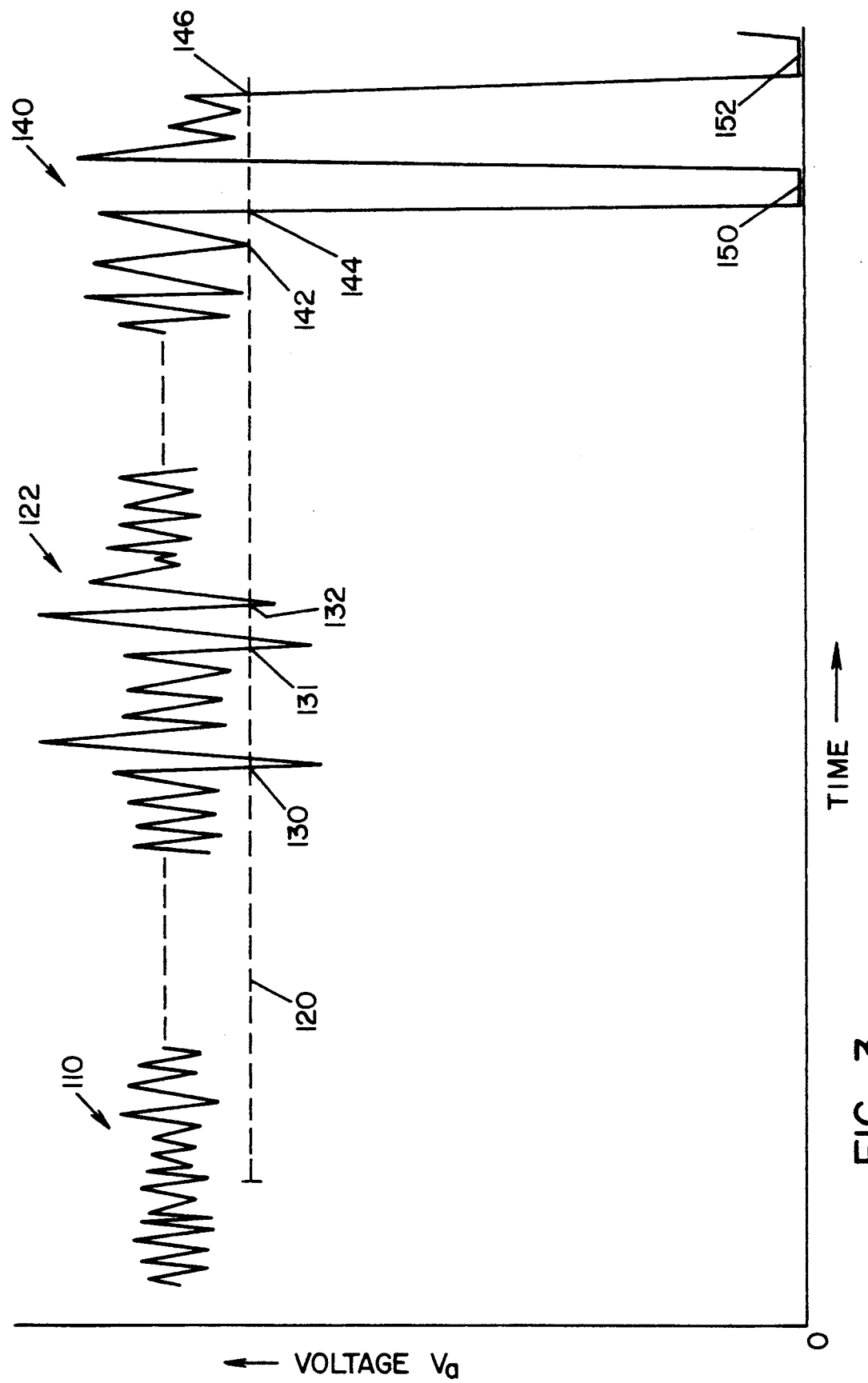
FIG. 3 is a voltage graph illustrating characteristics of the voltage across the arc while practicing the present invention.

In practice, the actual voltage $V_a$ across the workpiece and filler wire varies with the dynamics in the arc. This feature is illustrated in FIG. 3. In the high voltage mode, spray transfer of metal occurs with an arc having noise, as shown in area or portion 110. In accordance with the invention, the voltage or electrical noise or interference is recognized as causing a certain background variation in the actual voltage $V_a$ sensed by device 60. A threshold level 120, having a voltage outside of the electrical noise range occurring in the portion 110, is used to detect when the welding process shifts to the globular transfer mode, as shown in FIG. 2B. This globular transfer operation is shown as portion 122 of the voltage graph shown in FIG. 3. In the globular transfer operation, the voltage $V_a$ across the arc has large excursions which intersect threshold voltage 120 at points 130, 131 and 132. These are referred to as "events". As the events occur more rapidly, the testing device 10 identifies a globular transfer mode of operation. When the events are relatively low in number, it is indicative of the transfer region between a pure spray transfer shown as portion 110 and the globular transfer as shown as portion 122. As the voltage $V_T$ continues to drop, the welding process enters into the short circuit portion 140 wherein events occur at the intersection of threshold voltage 120 at points 142–146. This particular portion of welding creates actual shorts for events 144, 146 shown as short circuit points 150, 152, respectively. These points are accompanied by an event 144, 146, but are special events. Indeed, as the voltage $V_T$ continues to be lowered, most events are short circuit events as detected by sensing device 60 and communicated to testing device 10. In accordance with the present invention, the testing device 10 determines or locates a voltage $V_T$ as it is being reduced, which voltage has a precise location for each filler wire. This voltage is between the spray area 110 and the globular transfer area 122 of FIG. 3 and between the arc characteristics shown in FIG. 2A and then in FIG. 2B.

Figure 4:
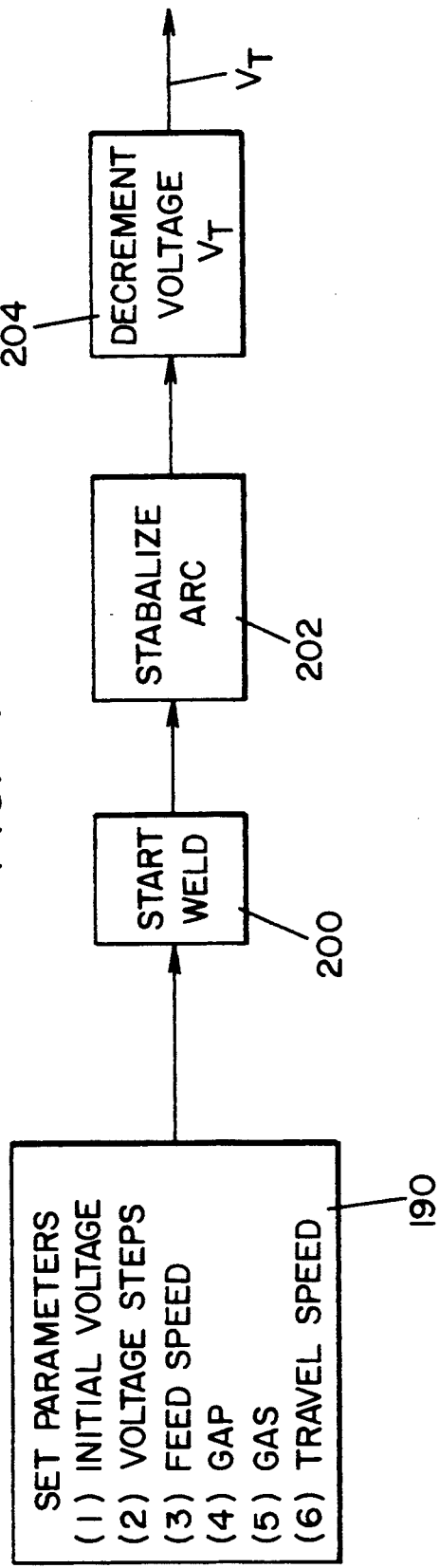
FIG. 4 is a block diagram illustrating certain characteristics of the preferrred embodiment of the present invention.
Figure 4A:
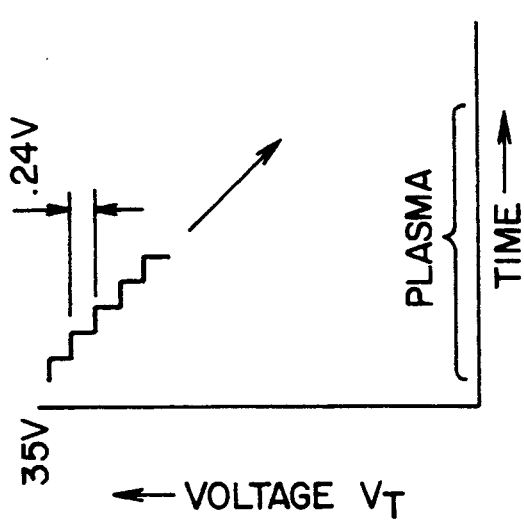
FIG. 4A is a graph illustrating operating characteristics of the block diagram shown in FIG. 4.
Figure 5:
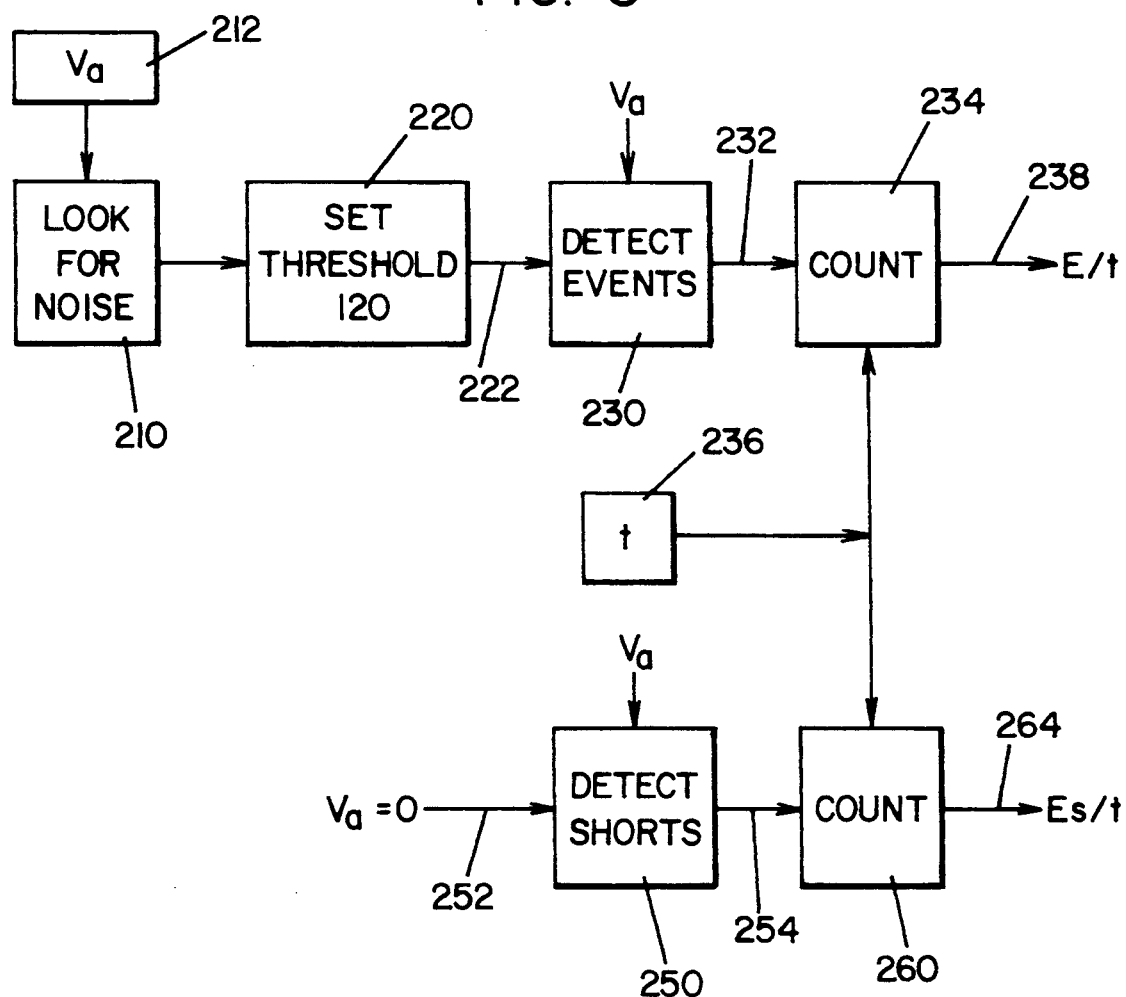
FIG. 5 is a block diagram of the steps performed, and means provided in implementating, the preferred embodiment of the present invention.
Figure 6:
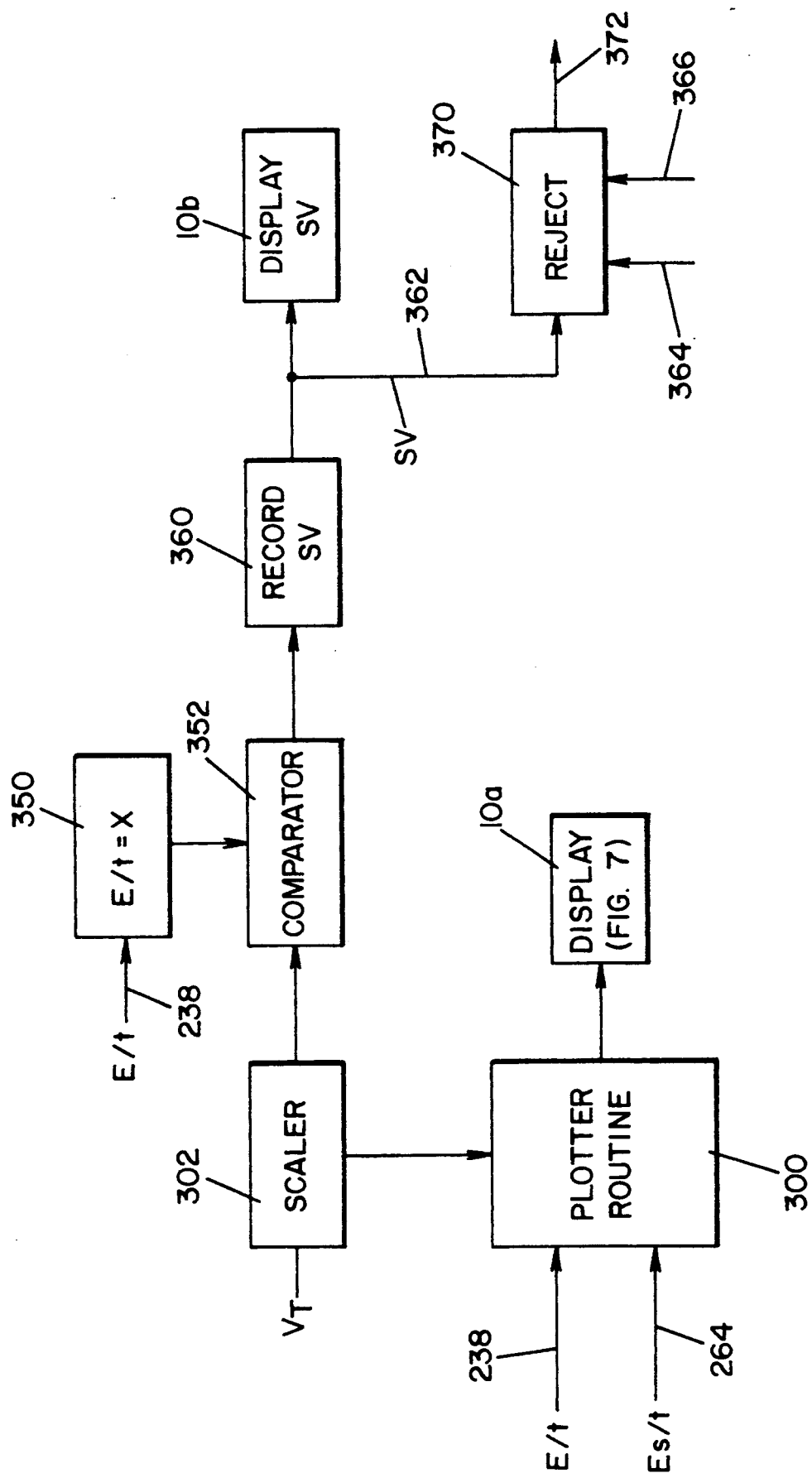
FIG. 6 is a block diagram showing further aspects of the preferred embodiment of the present invention as used in conjunction with the block diagrams illustrated in FIGS. 4 and 5.

In accordance with the present invention, the precise voltage referred to herein as the "spatter voltage" is selected by continuing to reduce the voltage $V_T$ across the welding wire and workpiece. This voltage reduction is accomplished as shown in the block diagram of FIG. 4. The testing operation is started in accordance with normal welding techniques after the parameters are set in device 10. This procedure is shown in box 190. The manual starting step is illustrated as box 200. The timing for the decrementing steps for the voltage has been set together with the amount that the voltage is decreased during each step. This is shown by box 190. The arc is allowed to stabilize as indicated by box 202. The test procedure or protocol is manually established as shown in FIG. 1 and represented in box 190. Then the computer starts the welding operation, uses the set voltage steps to decrease the voltage across lines 50, 52 as illustrated by block 204. This creates a voltage $V_T$ which decreases, as shown in FIG. 4A. During the initial high voltage operation the welding process has a long arc and is in the plasma area or spray transfer portion as shown in FIG. 3. As shown in FIG. 5, device 10 analyzes the portion 110 shown in FIG. 3 to determine the excursions caused by background electrical noise or interference. This procedure is illustrated as arc 210 with the input to device 10 illustrated as block 212. The output of the electrical noise identification subroutine of the computer program, shown as box 210, is directed to the input of the other subroutines for setting the threshold voltage 120, as shown in FIG. 3. The selection of the threshold is illustrated in box 220 and has an output 222 directed to the input of event detector 230 having another input $V_a$. Whenever $V_a$ intersects the voltage 120 stored in the area of the computer illustrated as line 222, an event is detected and transferred through line 232 to event counter 234. This counter has an input 236 which directs real time to counter storage 234. By integrating the number of events from line 232 over time t as inputted from block 236, an output signal occurs in line 238 which is the events per length of time, E/t, in this preferred embodiment, per second. In a like manner, FIG. 5 shows a short detector 250 similar to an event detector; however, the input of this detector is set to substantially zero voltage, as shown in the input line 252. Output line 254 directs a detected short to counter stage 260 having the same time base control 236. Thus, the output in line 264 Es/t is the number of shorts occurring per unit time across the arc, as shown in FIG. 2C. A computer program employing the concepts shown in FIGS. 4 and 5 performs the primary aspects of the present invention. The amount of events are counted and integrated. When there is pure plasma or spray transfer, there are essentially no events E, except when the wire is inferior. It is assumed that the wire does not create events E during the initial high voltage operation shown as portion 110. If such events are created, the wire can be summarily rejected. The use of the information in lines 238, 264 is schematically illustrated by the block diagram shown in FIG. 6. The information on lines 238, 264 is directed to plotter routine 300 to display the information shown in FIG. 7 on the display panel 10a, shown in FIG. 1. The integrated levels are numerical values in line 238, 264. These numerical values are plotted by routine 300 at each step of the voltage $V_T$ as illustrated by the scaler 302 shown in FIG. 6. Plotter routine 300 plots a curve 310 of the value E/t at each voltage $V_T$. This plotting process creates two graphs shown in FIG. 7, which graphs are displayed at panel 10a in FIG. 1. The primary information obtained by the present invention is the spatter voltage SV, shown in FIG. 7, as the intersection of plotted curve 310 with a line 312. Line, in practice is 15 E/t. The plotted curve 310 is divided between the spray segment, or portion 320, and the globular portion 322. This is a transition, or transfer, region 330, as shown in FIG. 7. As the voltage decreases, curve 310, plotted by routine 300, transfers from a substantially horizontal line portion 320 to an angular line in portion 322. This transfer area, or region 330, is a distinct welder perceived location in a welding process. In accordance with the invention, the number of events per second (E/t) to provide the spatter voltage value is a number in region 330. It has been found that the number for line 312, which is represented as X in FIG. 6 at box 350 is 15.0. To identify the spatter voltage SV, device 10 employs the information from output 238, which is directed to box 350 when the value of the digitally stored voltage presented by line 238 is the value X, i.e. 15.0, the comparator 352 transfers the voltage level $V_T$ from scaler 302 to memory location 360 for recording the spatter voltage SV. Such voltage can then be displayed in digital display unit 10b as shown in FIG. 1.

In accordance with another aspect of the present invention, the spatter voltage SV can be transmitted as indicated by line 362 to a tolerance portion of the computer program which is a series of logic gates having a maximum value set in line 364 and a minimum value set in line 366. If the spatter voltage is above the value set in line 364 or below a value set in line 366, the reject routine 370 creates a reject signal as indicated by a signal in line 372. In this manner, filler wire from a given manufacturer can be produced to have the same spatter voltage. This indicates that the wire is electrically consistent. In practice, this voltage can shift 0.5 volts in either direction and still be acceptable. However, even tighter tolerances are sought to assure exact consistent electrical operation of the filler wire.

Figure 7A:
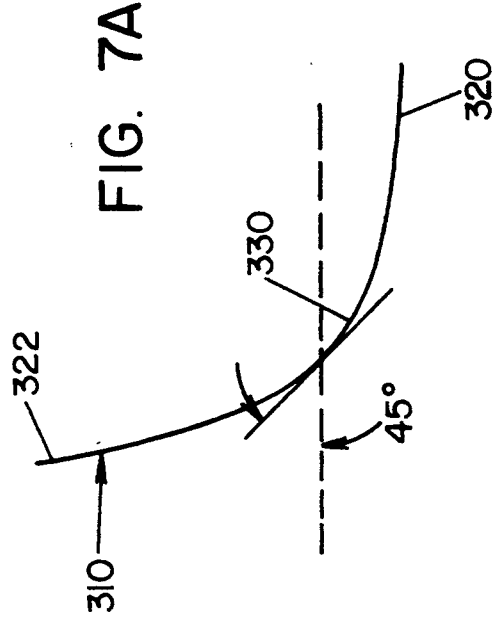
FIG. 7A is a partial graph similar to a portion of FIG. 7 illustrating a modification of the preferred embodiment of the present invention; and, FIG. 8 is a graph similar to the graph illustrated in FIG. 7 incorporating still a further use of the preferred embodiment of the present invention.
Figure 7:
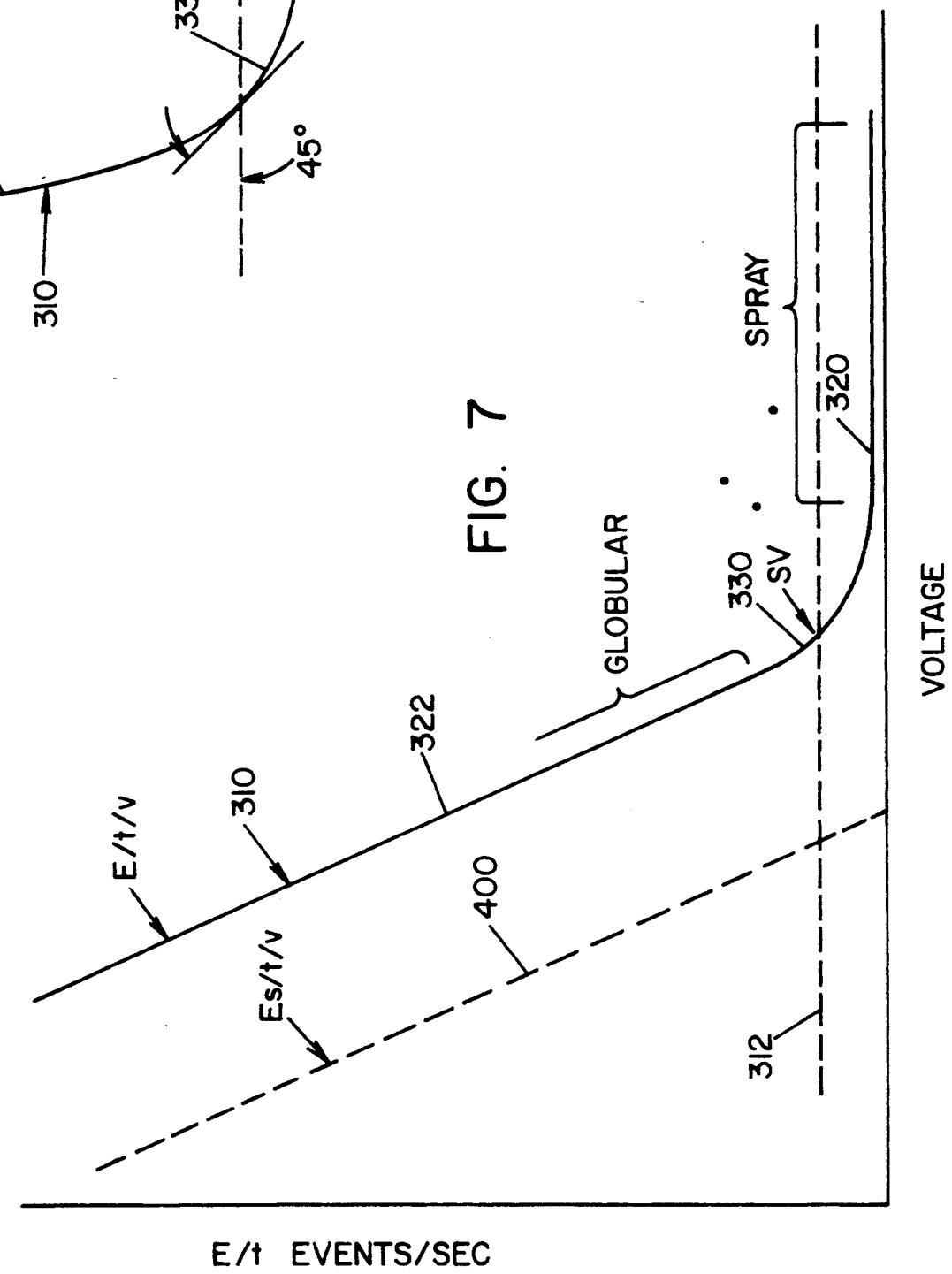
FIG. 7 is a graph illustrating the plotted values provided in accordance with the present invention using the preferred embodiment of the present invention, as schematically illustrated in FIGS. 4–6.
Figure 8:
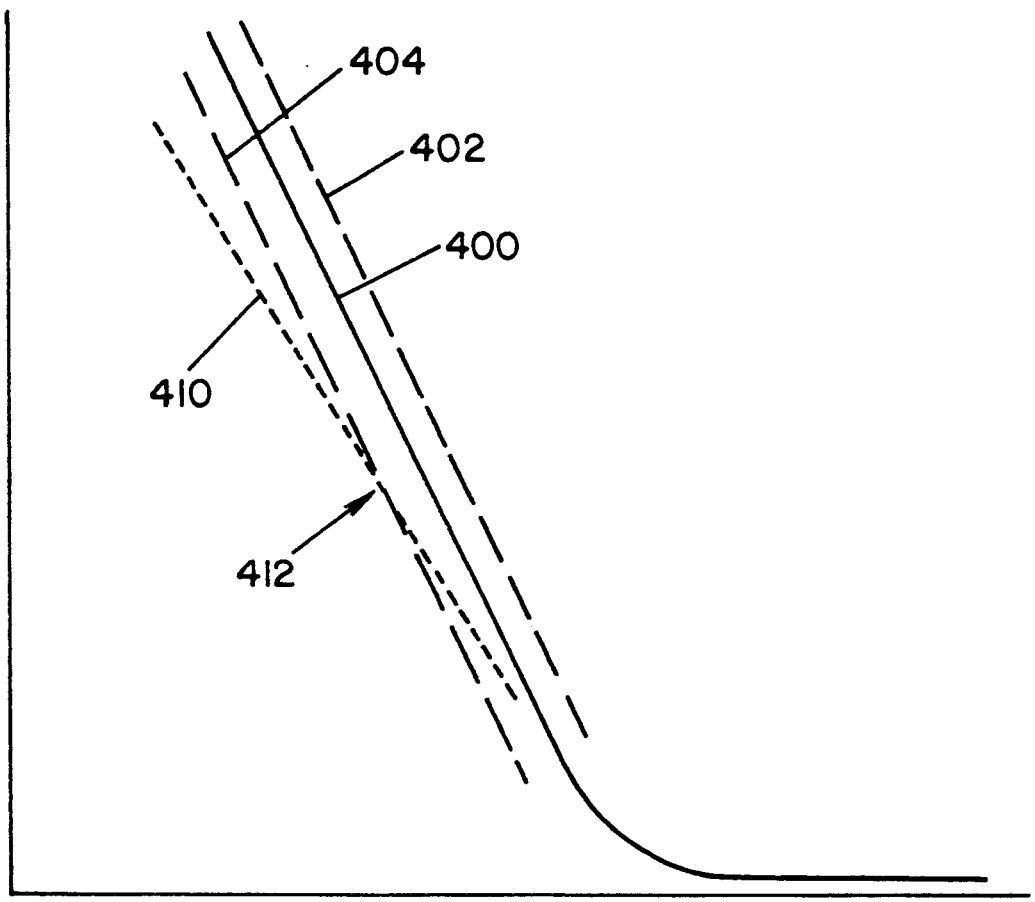

The plotted curve 400 of FIG. 7 is the number of shorts per second at all voltage levels $V_T$ interrogated by device 10. This information is displayed in panel 10a and used to measure and record short characteristics of the filler wire. The curves shown in FIG. 7 appear at panel 10a. The manufacturer compares plotted curve 400 to a standard curve. As shown in FIG. 8, curve 400 is compared in a plotted form with the tolerance envelope defined by lines 402, 404. If the plotted curve, shown as dotted line 410 in FIG. 8, intersects one of the lines 402, 404, as shown at point 412, the filler wire is rejected by the manufacturer. This signature analysis concept could be implemented for line 310 shown in FIG. 7.

A modification of the preferred embodiment of the present invention is illustrated in FIG. 7A wherein plotted curve 310 is analyzed by a slope detector. When the slope of line 310 is at a given value between 35°-50°, and preferably 45°, the comparator of box 352 is enabled for the purposes of storing the voltage $V_T$ at this detected slope of curve 310. This slope detection concept is employed as an appropriate alternative to a purely numeric analysis for locating the spatter voltage and storing this voltage in the memory area 360 shown in FIG. 6.

The stored spatter voltage SV is indicative of the performance of the filler wire. In manufacturing, this voltage must be retained within very tight tolerances, as explained above. It has been found that by selecting a voltage in transition region 330 for detecting the parameter identified as spatter voltage, this voltage does accurately indicate consistency from one reel of wire to the next reel. By maintaining this spatter voltage at the same value, there is no need for resetting the automatic welding machines when one reel of wire is replaced with a next reel of wire. Consistency is assured. In addition, the determination of spatter voltage allows the adjusted position for low spatter to be at the same voltage value from one wire to the next from day-to-day. The use of the present invention to assure consistency of filler wire overcomes substantial commercial problems associated with this welding technology.

A filler wire that creates a curve 310 wherein portion 322 is relatively vertical and outside the envelope schematically illustrated in FIG. 8 produces relatively inferior operation of the filler wire. It has been found that if portion 322 is vertical, for a tested wire small decreases in voltage at a position to the left of vertical line 322 will cause drastic eruptions in the wire. For that reason, the slope of the line or the plotted curve created by the present invention, and shown in FIG. 7, is valuable in evaluating the performance of a filler wire. The slope detector used in the embodiment shown in FIG. 7A is also used for measuring the slope of portion 322. When the slope of portion 322 is more than a set value, the wire is rejected. When the slope of line 322 is to nearly vertical, the wire will be defective and should not be used in automatic welding procedures.

The example of the invention in this disclosure employed at least about 75°-80° Argon as the shielding gas; however, the spatter voltage of a wire is identifiable by the invention when less Argon is used in the shielding gas. In this situation curve 310 of FIG. 7 has a less abrupt transition and the spray portion is merely the high voltage section of the curve. If a wire being tested by this invention has random E/t points above the threshold line 312, as shown in FIG. 7, the wire is unstable and is considered for rejection according to the standards of the wire manufacturer.

The spatter voltage SV occurs at a voltage $V_T$ near the area where there is a minimum amount of unwanted air borne particulate discharge, i.e. smoke or fumes; consequently, the spatter voltage is used to locate the operating voltage for low fume welding. The voltage steps used in the invention reduce the applied voltage from 25–45 volts D.C. down to 10–15 volts D.C. in 30–100 steps of 0.02–0.50 volts. This process is performed in substantially less than 5.0 minutes, i.e. about 1.0–1.5 minutes.

Even though the invention is particularly adapted for use with solid filler wire, it is also used to test cored electrode wire.

Having thus defined the invention, the following is claimed:

1. Method for locating a voltage sensitive parameter of an electric arc welding wire, which parameter is indicative of the welder perceived welding characteristics of said filler wire, said method comprises the steps of:
   (a) feeding said wire toward a workpiece;
   (b) applying a voltage between said filler wire and said workpiece whereby a welding arc is created between said filler wire and said workpiece to melt and deposit said filler wire onto said workpiece by a voltage sensitive arc welding procedure;
   (c) gradually changing said applied voltage whereby said welding procedure shifts through a transfer region and between spray and globular welding;
   (d) detecting the actual voltage between the wire and workpiece as said applied voltage is changed;
   (e) sensing each time when said actual voltage decreases below a selected threshold voltage;
   (f) averaging the sensed number of times;
   (g) comparing said sensed number of times to said applied voltage, where said sensed number of times function of said applied voltage and detecting the applied voltage value when the averaged sensed number of times equals a selected number; and,
   (h) selecting said selected number to have a value indicative of said welding procedure being in said transfer region.

2. A method as defined in claim 1 wherein said voltage changing step decreases said applied voltage in uniform steps over uniform time periods.

3. A method as defined in claim 2 wherein said voltage changing steps are in the range of 0.02–0.5 volts and about 30–100 said steps occur in about 1.0 minutes.

4. A method as defined in claim 2 wherein said averaging step is performed during each of said uniform steps.

5. A method as defined in claim 1 wherein said applied voltage is changed from about 25–45 volts D.C. down to about 10–15 volts D.C.

6. A system for locating a voltage sensitive parameter of an electric arc welding filler wire, which parameter is indicative of the welder perceived welding characteristics of said wire, said system comprises: means for feeding said wire toward a workpiece; means for applying a voltage between said wire and said workpiece whereby a welding arc is created between said wire and said workpiece to melt and deposit said filler wire onto said workpiece by a voltage sensitive arc welding procedure; means for gradually changing said applied voltage whereby said welding procedure shifts through a transfer region and between spray and globular welding; means detecting the actual voltage between the wire and workpiece as said applied voltage is changed; means for sensing each time when said actual voltage decreases below a selected threshold voltage; means for averaging the sensed number of times; means for comparing said sensed number of times to said applied voltage, where said sensed number of times is a function of said applied voltage and means for detecting the applied voltage value when the averaged sensed number of times equals a selected number; and, means for selecting said selected number to have a value indicative of said welding procedure being in said transfer region.

7. Method for locating a voltage sensitive parameter of an electric arc welding wire, which parameter is indicative of the welder perceived welding characteristics of said wire, said method comprises the steps of:
   (a) feeding said wire toward a workpiece;
   (b) applying a voltage between said wire and said workpiece whereby a welding arc is created between said wire and said workpiece to melt and deposit said wire onto said workpiece by a voltage sensitive arc welding procedure;
   (c) gradually changing said applied voltage whereby said welding procedure shifts through a transfer region and between spray and globular welding;
   (d) detecting the actual voltage between the wire and workpiece as said applied voltage is changed;
   (e) sensing each time when said actual voltage decreases below a selected threshold voltage;
   (f) averaging the sensed number of times;
   (g) plotting a curve of said averaged number of times as a function of said applied voltage;
   (h) detecting on said curve the applied voltage value when the averaged sensed number of times equals a selected number; and,
   (i) selecting said selected number to have a value indicative of said welding procedure being in said transfer region.

8. A method as defined in claim 7 wherein said detection step is a determination when said plotted curve reaches a selected angle in said plotted curve.

9. A method as defined in claim 8 wherein said selected angle is in the range of 35°–50°.

10. A method as defined in claim 8 wherein said angle is about 45°.

11. A system for locating a voltage sensitive parameter of an electric arc welding wire, which parameter is indicative of the welder perceived welding characteristics of said wire, said system comprises:
   means for feeding said wire toward a workpiece;
   means for applying a voltage between said wire and said workpiece whereby a welding arc is created between said wire and said workpiece to melt and deposit said wire onto said workpiece by a voltage sensitive arc welding procedure;
   means for gradually changing said applied voltage whereby said welding procedure shifts through a transfer region and between spray and globular welding;
   means for detecting the actual voltage between the wire and workpiece as said applied voltage is changed;
   means for sensing each time when said actual voltage decreases below a selected threshold voltage;
   means for averaging the sensed number of times;
   means for plotting a curve of said averaged number of times as a function of said applied voltage;
   means for detecting on said plotted curve the applied voltage value when the averaged sensed number of times equals a selected number; and,
   means for selecting said selected number to have a value indicative of said welding procedure being in said transfer region.

12. A system as defined in claim 11 wherein said means for detecting step determines when said plotted curve reaches a selected angle in said plotted curve.

13. A system as defined in claim 12 wherein said selected angle is in the range of 35°–50°.

14. A system as defined in claim 12 wherein said angle is about 45°.

* * * * *